United States Patent
Welsh et al.

(10) Patent No.: US 12,168,258 B2
(45) Date of Patent: Dec. 17, 2024

(54) TABLE SAW

(71) Applicant: BLACK & DECKER INC., New Britain, CT (US)

(72) Inventors: Robert P. Welsh, Phoenix, MD (US); Kathy E. DiPasquale, Baltimore, MD (US); Daniel N. Lopano, Bel Air, MD (US); John E. Buck, Cockeysville, MD (US); Carl F. Merhar, III, Parkville, MD (US); Yung Ho Chang, Ta Li (TW); Nicholas E. Achterberg, New Freedom, PA (US)

(73) Assignee: BLACK & DECKER INC., New Britain, CT (US)

( * ) Notice: Subject to any disclaimer, the term of this patent is extended or adjusted under 35 U.S.C. 154(b) by 547 days.

(21) Appl. No.: 17/018,236

(22) Filed: Sep. 11, 2020

(65) Prior Publication Data

US 2021/0078089 A1    Mar. 18, 2021

Related U.S. Application Data

(63) Continuation of application No. 15/686,271, filed on Aug. 25, 2017, now Pat. No. 10,864,584, which is a continuation of application No. 13/345,117, filed on Jan. 6, 2012, now Pat. No. 9,776,260, which is a continuation of application No. 11/408,401, filed on Apr. 21, 2006, now Pat. No. 8,584,564.

(51) Int. Cl.
| | |
|---|---|
| *B23D 45/06* | (2006.01) |
| *B23D 47/02* | (2006.01) |
| *B27B 5/16* | (2006.01) |
| *B27B 5/29* | (2006.01) |

(52) U.S. Cl.
CPC ......... *B23D 45/068* (2013.01); *B23D 47/025* (2013.01); *B27B 5/16* (2013.01); *B27B 5/29* (2013.01); *Y10T 83/727* (2015.04); *Y10T 83/7705* (2015.04); *Y10T 83/773* (2015.04)

(58) Field of Classification Search
CPC ...... B23D 45/00; B23D 45/06; B23D 45/068; B23D 47/00; B23D 47/02; B23D 47/025; B27B 5/222; B27B 5/24; B27B 5/243; B27B 5/265; B27B 5/10; B27B 27/00; B27B 27/02; B27B 27/08; B27B 27/10
See application file for complete search history.

(56) References Cited

U.S. PATENT DOCUMENTS

| | | | |
|---|---|---|---|
| 1,894,258 A | 1/1933 | Eastlack | |
| 1,938,548 A * | 12/1933 | Tauts | B23Q 1/74 83/438 |
| 2,696,852 A | 12/1954 | Dunton | |
| 2,990,859 A | 7/1961 | Ruben | |
| 3,139,128 A | 6/1964 | Urschel | |

(Continued)

OTHER PUBLICATIONS https://www.merriam-webster.com/dictionary/boss.*

*Primary Examiner* — Adam J Eiseman
*Assistant Examiner* — Richard D Crosby, Jr.
(74) *Attorney, Agent, or Firm* — Adan Ayala

(57) ABSTRACT

A table saw has a base assembly, a table assembly supported by the base assembly, and a saw assembly supported by at least one of the table assembly and the base assembly. The saw assembly includes a saw blade extending through the table assembly. The base assembly has at least one tube connected to the table assembly.

6 Claims, 4 Drawing Sheets

(56) References Cited

U.S. PATENT DOCUMENTS

| | | | |
|---|---|---|---|
| 3,337,058 A | 8/1967 | Sandrick | |
| 3,731,956 A | 5/1973 | Hanley | |
| 3,964,706 A | 6/1976 | Adams | |
| 4,001,903 A | 1/1977 | Hay | |
| 4,002,094 A * | 1/1977 | Erickson | B23D 45/044 83/471.3 |
| 4,026,173 A | 5/1977 | Livick | |
| 4,043,754 A | 8/1977 | Sklar | |
| 4,186,784 A | 2/1980 | Stone | |
| 4,209,045 A | 6/1980 | Bassett | |
| 4,252,239 A * | 2/1981 | Snyder | B23D 57/0092 206/349 |
| 4,266,386 A | 5/1981 | Bains | |
| 4,370,909 A | 2/1983 | Jennings | |
| 4,377,099 A | 3/1983 | Howe | |
| 4,396,176 A | 8/1983 | Hannula | |
| 4,485,711 A | 12/1984 | Schnell | |
| 4,658,687 A * | 4/1987 | Haas | B27B 27/02 269/238 |
| 4,733,703 A | 3/1988 | Cimino | |
| 4,909,491 A | 3/1990 | Cheng | |
| 4,941,571 A | 7/1990 | Barrett | |
| 4,962,685 A | 10/1990 | Hagstrom | |
| 4,964,450 A * | 10/1990 | Hughes | B23D 47/025 144/286.5 |
| 4,997,085 A | 3/1991 | Brennan | |
| 5,016,509 A | 5/1991 | Stottman | |
| 5,123,317 A * | 6/1992 | Barnes, Jr. | B23D 47/025 83/477.1 |
| 5,174,349 A | 12/1992 | Svetlik | |
| 5,341,711 A | 8/1994 | Stay | |
| 5,346,063 A | 9/1994 | Chow | |
| 5,427,231 A | 6/1995 | Willimann | |
| 5,460,070 A * | 10/1995 | Buskness | B23Q 3/007 269/303 |
| 5,619,896 A | 4/1997 | Chen | |
| 5,694,994 A | 12/1997 | Engler | |
| 5,722,308 A * | 3/1998 | Ceroll | B23Q 3/007 144/253.1 |
| 5,845,555 A * | 12/1998 | Dawley | B23Q 16/006 83/467.1 |
| 5,875,698 A * | 3/1999 | Ceroll | B23D 45/067 83/473 |
| 5,954,106 A * | 9/1999 | Huang | B23D 47/025 144/286.5 |
| 5,970,663 A | 10/1999 | McDonough | |
| 5,992,284 A | 11/1999 | Bucks | |
| 6,009,782 A * | 1/2000 | Tajima | B23D 59/006 83/471.3 |
| 6,182,538 B1 | 2/2001 | Chen | |
| 6,240,822 B1 * | 6/2001 | Musser | B23D 47/025 144/145.1 |
| 6,360,642 B1 * | 3/2002 | Miller | B27B 27/02 269/303 |
| 6,360,798 B1 | 3/2002 | Apolinski | |
| 6,539,831 B2 | 4/2003 | Huang | |
| 6,578,461 B1 | 6/2003 | Loo | |
| 6,616,369 B2 | 9/2003 | Clark | |
| 6,688,350 B2 | 2/2004 | Heinlen | |
| 6,722,807 B1 | 4/2004 | Cornet | |
| 6,725,755 B1 * | 4/2004 | Svetlik | B23D 47/025 83/468 |
| 6,732,623 B1 | 5/2004 | Jennings | |
| 6,736,042 B2 | 5/2004 | Behne | |
| 6,758,350 B2 | 7/2004 | Lin | |
| 6,843,488 B1 | 1/2005 | Tseng | |
| 6,899,004 B1 | 5/2005 | Miller | |
| 6,907,807 B2 * | 6/2005 | Parks | B23D 45/067 83/473 |
| 6,986,370 B1 | 1/2006 | Schoene | |
| 7,051,884 B2 | 5/2006 | Dick | |
| 7,077,275 B2 | 7/2006 | Kao | |
| 7,178,440 B2 | 2/2007 | Bucks | |
| 7,404,350 B2 * | 7/2008 | Chuang | B27B 27/02 83/438 |
| 7,647,956 B1 | 1/2010 | Cona | |
| 7,707,920 B2 * | 5/2010 | Gass | B23D 59/001 83/781 |
| 7,827,890 B2 * | 11/2010 | Gass | B23D 45/067 83/102.1 |
| 8,240,079 B2 | 8/2012 | Wakefield | |
| 8,601,926 B2 | 12/2013 | Frolov | |
| 8,939,474 B2 | 1/2015 | Hagemeyer | |
| 9,302,371 B2 * | 4/2016 | Chen | B25B 11/00 |
| 9,403,284 B2 * | 8/2016 | Liu | B23Q 3/005 |
| 10,092,968 B2 * | 10/2018 | Fulmer | B23D 47/025 |
| 10,759,082 B2 * | 9/2020 | Chang | B27B 27/10 |
| 10,933,554 B2 * | 3/2021 | Fulmer | B23D 47/12 |
| 2003/0047895 A1 | 3/2003 | McElroy | |
| 2003/0079592 A1 * | 5/2003 | Lee | B23D 47/025 83/438 |
| 2004/0134324 A1 * | 7/2004 | Sheddy | B27B 5/38 83/581 |
| 2004/0187666 A1 | 9/2004 | Huang | |
| 2005/0024021 A1 * | 2/2005 | Zeiler | H02J 7/0027 320/134 |
| 2005/0083639 A1 * | 4/2005 | Zick | H01M 50/20 361/600 |
| 2005/0204884 A1 * | 9/2005 | Huang | B23D 47/025 83/477.2 |
| 2005/0264260 A1 * | 12/2005 | Zick | H01M 50/20 320/114 |
| 2005/0285560 A1 * | 12/2005 | Glasgow | H02J 7/0042 320/111 |
| 2006/0070503 A1 * | 4/2006 | Shibata | B27B 27/02 83/438 |
| 2006/0090619 A1 * | 5/2006 | Huang | B27B 27/02 83/438 |
| 2007/0056418 A1 | 3/2007 | Lung | |
| 2008/0185493 A1 | 8/2008 | Wakefield | |
| 2008/0302739 A1 | 12/2008 | Van Landingham | |
| 2011/0017040 A1 * | 1/2011 | Folov | B26D 7/01 83/446 |
| 2015/0059546 A1 * | 3/2015 | Chang | B27B 27/08 83/438 |
| 2015/0107429 A1 * | 4/2015 | Ceroll | B23D 47/025 83/468.7 |
| 2015/0273723 A1 * | 10/2015 | Gass | B27B 27/02 83/438 |
| 2016/0288361 A1 * | 10/2016 | Chang | B23D 47/025 |
| 2017/0057112 A1 * | 3/2017 | Chen | B27B 27/08 |

\* cited by examiner

TABLE SAW

FIELD OF THE INVENTION

This invention relates generally to a table saw and more specifically to construction techniques for manufacturing table saws.

BACKGROUND OF THE INVENTION

Typical portable table saws have a table, a base supporting the table, a saw assembly attached to the table and/or the base. The base is typically made of metal or plastic. Bases made of metal are typically heavy and relatively flexible, as they consist mostly of metal paneling. Bases made of plastic on the other hand could break when the table saw is dropped.

SUMMARY OF THE INVENTION

In accordance with the present invention, an improved table saw is employed. The table saw has a base assembly, a table assembly supported by the base assembly, a saw assembly supported by at least one of the table assembly and the base assembly, the saw assembly including a saw blade extending through the table assembly, wherein the base assembly comprises at least one tube connected to the table assembly.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIGS. 5A-5B are front and left views of the table saw, respectively;

DETAILED DESCRIPTION

Figure 1:
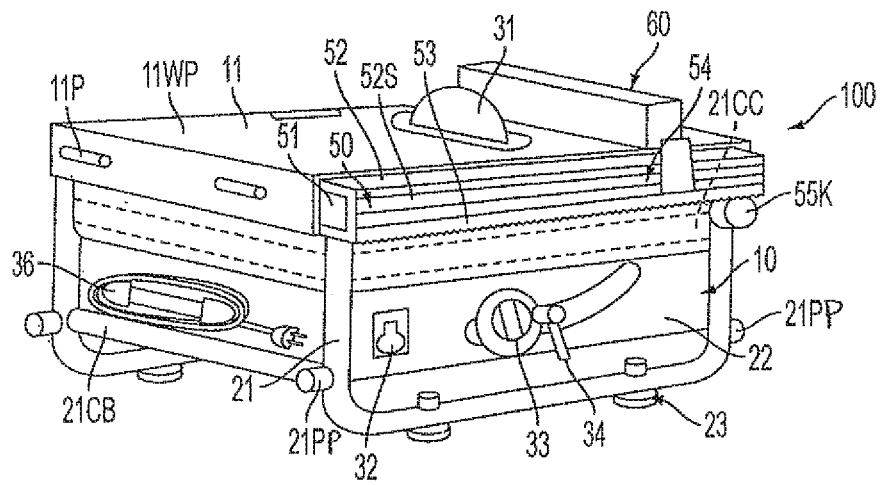
FIG. 1 illustrates a table saw according to the invention.

The invention is now described with reference to the accompanying figures, wherein like numerals designate like parts. Referring to FIG. 1, a table saw 100 may include a base assembly 10, a table assembly 11 supported by base assembly 10, and a saw assembly (not shown) supported by the table assembly 11. Persons skilled in the art will recognize that the construction of the saw assembly is well known and can be found in U.S. Pat. Nos. 5,875,698, 6,009,782, and 6,907,807, all of which are hereby incorporated by reference.

The saw assembly may include a blade 31, extending through table assembly 11.

Base assembly 11 may include at least one tube 21 attached to table assembly 10. Tube 21 may be made of a composite material, such as carbon fiber or fiber glass, extruded metal, such as aluminum, steel tubing or molded plastic. Persons skilled in the art will recognize plastic tubing may be molded via gas-assist, injection molded, etc.

Preferably, base assembly 10 has two substantially U-shaped tubes 21 connected to table assembly 11. Each U-shaped tube 21 has an upper cross-bar 21CC connecting two legs of the tube 21. Cross-bars 21CB may be disposed between and connect the two U-shaped tubes 21. Cross-bars 21CB and/or 21CC are preferably welded or bolted unto tubes 21.

Figures 2, 3:
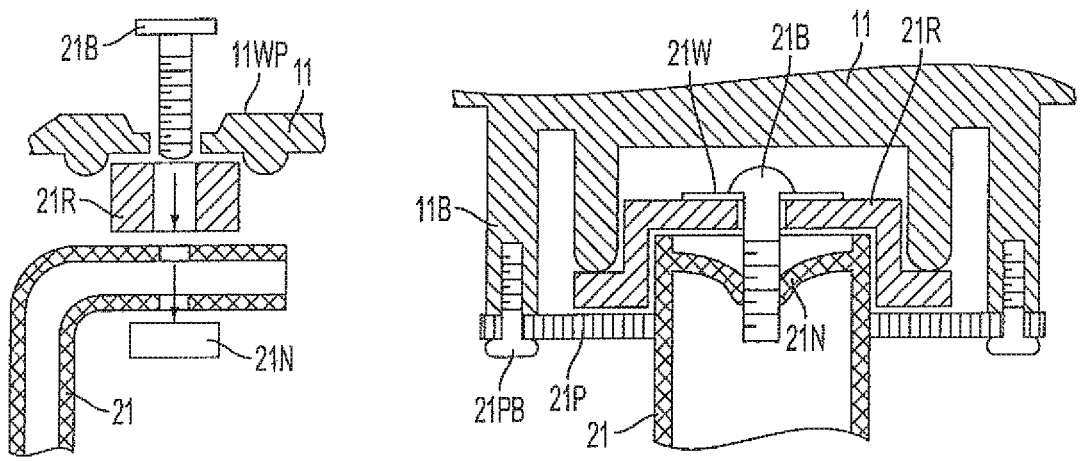
FIG. 2 is a partial cross-sectional view illustrating a first method of connecting a tube to the table.
FIG. 3 is a partial cross-sectional view illustrating a second method of connecting a tube to the table.

Tubes 21 may be bolted directly unto table assembly 21. Alternatively, a flexible gasket 21R may be disposed between table assembly 11 and tube 21. Referring to FIG. 2, a substantially annular gasket 21R may be disposed between table assembly 11 and tube 21. A bolt 21B may extend through table assembly 11, gasket 21R and tube 21, and threadingly engage nut 21N. Preferably, bolt 21B is inserted through a countersunk hole on table assembly 11 so that the bolt head will lie flush with or underneath the table workpiece support plane 11WP.

Another method of connecting tube 21 to table assembly 11 is shown in FIG. 3, where like numerals refer to like parts. Rather than extending through table assembly 11, bolt 21B may extend through a washer 21W and gasket 21R, and into tube 21. Tube 21 may have threaded area 21N integrated within or snapped unto tube 21 threadingly engaging bolt 21B. The assembly is then preferably held in place via a plate 21P sandwiching gasket 21R between plate 21P and table assembly 11. Plate 21P may be bolted unto bosses 11B via bolts 21PB.

Persons skilled in the art shall recognize that it may be desirable to ensure that gasket 21R is flexible in order to isolate shocks between the table assembly 11 and base assembly 10. Gasket 21R is preferably made of thermoplastic rubber, having a hardness of about 70 to about 80 Shore A. Preferably the hardness of gasket 21R is about 75 Shore A.

Tubes 21 may have adjustable feet assemblies 23. Persons skilled in the art will recognize that providing adjustable feet assemblies 23 will allow a user to adjust table saw 100 so that table assembly 11 is substantially horizontal.

Figure 4:
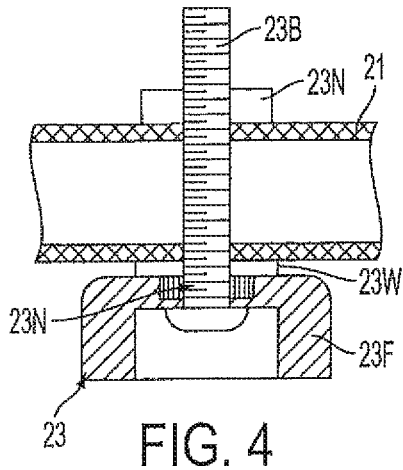
FIG. 4 is a partial cross-sectional view illustrating an adjustable foot assembly.

Referring to FIG. 4, foot assembly 23 preferably includes a foot 23F. Foot 23F is preferably made of rubber, such as thermoplastic rubber, or another flexible material. A bolt 23B may extend through foot 23F, a washer 23W and tube 21, and threadingly engage nuts 23N disposed on both sides of tube 21. A user would adjust the foot assembly by rotating bolt 23B and nuts 23N until the desired position is obtained.

Referring to FIGS. 1 and 5, panels 22 may be disposed on tube(s) 21. Panels 22 may be made of metal or plastic. A front panel 22 may support an on/off switch 32, a height adjustment crank 33 and a bevel lock crank 34. Preferably, the front tube 21 defines a front plane RP. Persons skilled in the art will recognize that it is desirable to shape the front tube 21 and front panel 22 so that the on/off switch 32, the height adjustment crank 33 and/or the bevel lock crank 34 do not extend beyond front plane RP.

Similarly, a side panel 22 may support a cord wrap 36 or a wrench (not shown). Preferably, the tubes 21 define a side plane RR. Persons skilled in the art will recognize that it is desirable to shape the tubes 21 and side panel 22 so that the cord wrap 36 and/or a wrench do not extend beyond the side plane RR.

Figure 5A:
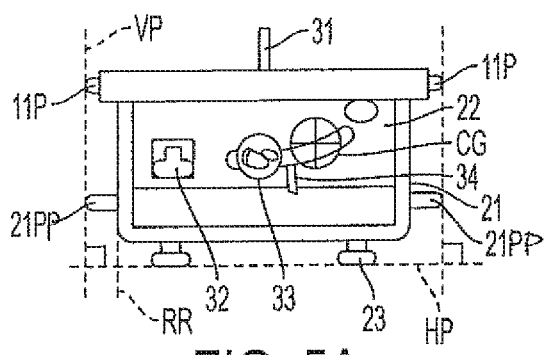
FIGS. 5A-5B illustrate the arrangement of controls relative to the base assembly, where
Figure 5B:
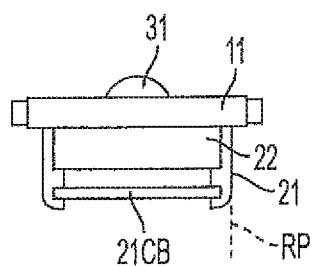

Referring to FIGS. 5A-5B, foot assemblies 23 preferably define a substantially horizontal plane HP. It is desirable that the center of gravity CG is disposed between the foot assemblies 23.

Tubes 21 may have protrusions 21P extending substantially sidewardly. Table assembly 11 may have protrusions 11P extending substantially sidewardly. Preferably protrusions 21P and table assembly 11 and/or protrusions 11P define a substantially vertical plane VP, which may be substantially perpendicular to horizontal plane HP.

Center of gravity CG is preferably disposed between protrusions 21P and table assembly 11 and/or protrusions 11P. This would allow a user to stably dispose table saw 100 on its side, so that protrusions 21P and table assembly 11 and/or protrusions lip are resting on the floor or other substantially horizontal surface.

Figure 7:
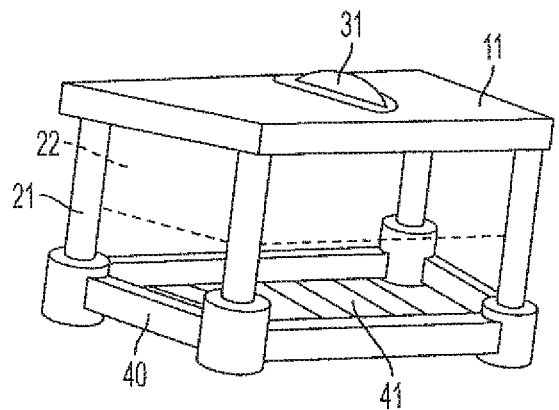
FIG. 7 is a perspective view of a second embodiment of the table saw according to the invention.

Another embodiment of base assembly 10 is shown in FIG. 7, where like numerals refer to like parts. In this embodiment tubes 21 connect table assembly 11 to a molded base 40. Preferably, base 40 is blow-molded from an impact-resistant plastic material. Persons skilled in the art are referred to US Published Application Nos. 20050024021, 2005008301, 20050083639, 20050264260 and 20050285560, which are fully incorporated by reference, for information on how base 40 is formed and how tubes 21 may be connected to base 40. Preferably base 40 has a floor 41.

Figure 8:
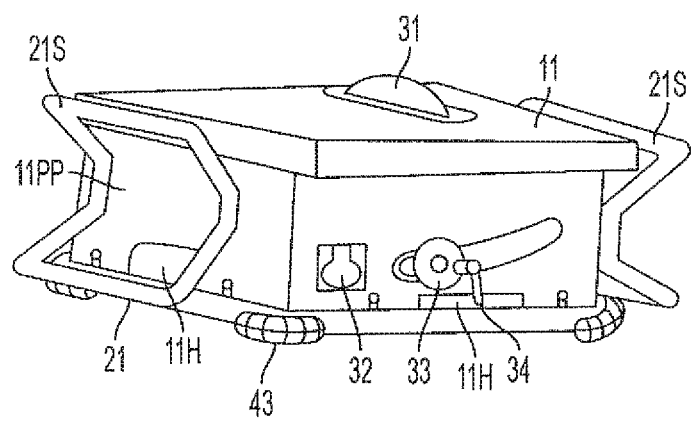
FIG. 8 is a perspective view of a third embodiment of the table saw according to the invention.

Another embodiment of base assembly 10 is shown in FIG. 8, where like numerals refer to like parts. In this embodiment, table assembly 11 includes panels 11P supporting the saw assembly, the on/off switch 32, the height adjustment crank 33 and/or the bevel lock crank 34. One or more tubes 21 may be disposed underneath panels 11PP to support table saw 100. Preferably, tube(s) 21 are bolted unto panels 11PP.

Feet 43 may be bolted unto tube(s) 21. Feet 43 may be made of rubber, thermoplastic rubber or other flexible materials.

Tube(s) 21S may also be bolted to the side of panels 11PP. Persons skilled in the art will recognize that tube(s) 21S may be shaped so that they can act as workpiece supports. Accordingly, it is preferable that the top surfaces of tube(s) 21S be substantially coplanar with or below workpiece support plane 11WP. Persons skilled in the art will recognize that tube(s) 21S may also be shaped so that they can support the table saw 100 when disposed on its side.

At least one panel 11PP preferably has a hole 11H, allowing the user to use tube 21 as a handle. Persons skilled in the art will recognize that tube(s) 21S can also be used as handles.

Figure 9:
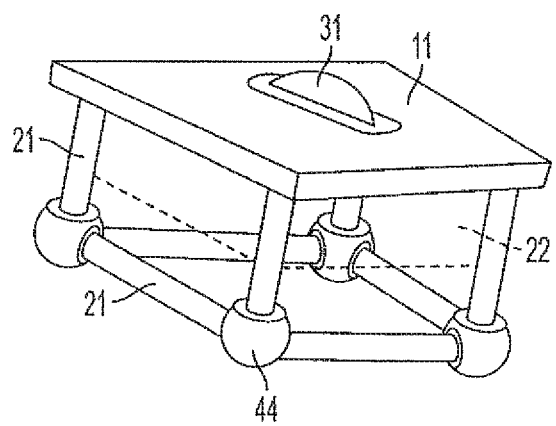
FIG. 9 is a perspective view of a fourth embodiment of the table saw according to the invention.

Another embodiment of base assembly 10 is shown in FIG. 9, where like numerals refer to like parts. In this embodiment, vertical and horizontal tubes 21 are connected to each other via joints 44. Joints 44 may be injection molded. Preferably joints 44 have a flexible component so the joints 44 can absorb shock, etc.

Referring to FIG. 1, table saw 100 preferably has a front rail assembly 50 attached to a front side of table assembly 11, a rear rail assembly 50 attached to a rear side of table assembly 11, the rail assemblies 50 supporting a fence assembly 60. Persons skilled in the art are referred to U.S. Pat. No. 5,722,308, which is fully incorporated by reference, for information on the construction of rail assembly 50 and fence assembly 60.

Figure 6:
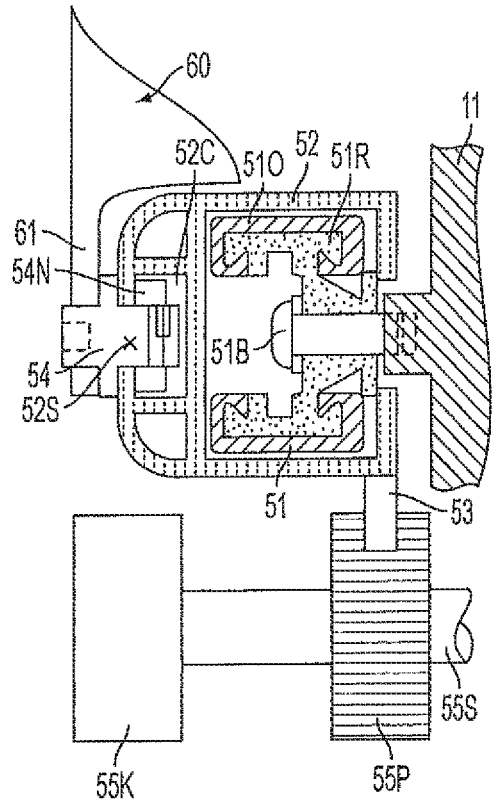
FIG. 6 is a cross-sectional view illustrating a rail assembly of the table saw.

Referring to FIGS. 1 and 6, each rail assembly 50 preferably includes a fixed rail assembly 51 bolted unto table assembly 11 via a bolt 51B. Rail assembly 51 may include a fixed rail 51R, which is preferably made of extruded aluminum. Fixed rail 51R may have an overmolded portion 510.

A sliding rail 52 may be slidingly disposed on each fixed rail assembly 51. Sliding rail 52 is preferably made of extruded aluminum. Sliding rail 52 preferably has a slot 52S and a channel 52C disposed adjacent to the slot 52S.

A boss 54 may extend through slot 52S and threadingly engage a nut 54N disposed in channel 52C. This allows a user to move boss 54 along slot 52S. Since fence assembly 60 has a mount 61 which is disposed on boss 54, the user can thus adjust the position of the fence assembly 60 relative to the sliding rail 52 and/or adjust the parallelism of fence assembly 60 relative to blade 31.

Each sliding rail 52 may have a rack 53. A shaft 55S preferably extends underneath table assembly 11. Shaft 55S has two pinions 55P fixedly disposed thereon meshing with racks 53. Shaft 55S and pinions 55P can be rotated via a knob 55K. With such arrangement, when the user rotates knob 55K, both sliding rails 52 will move an equal distance, maintaining fence assembly 60 parallel to blade 31.

Persons skilled in the art should recognize that fence assembly 60 has a latch (not shown) that engages slot 52S.

Figure 10:
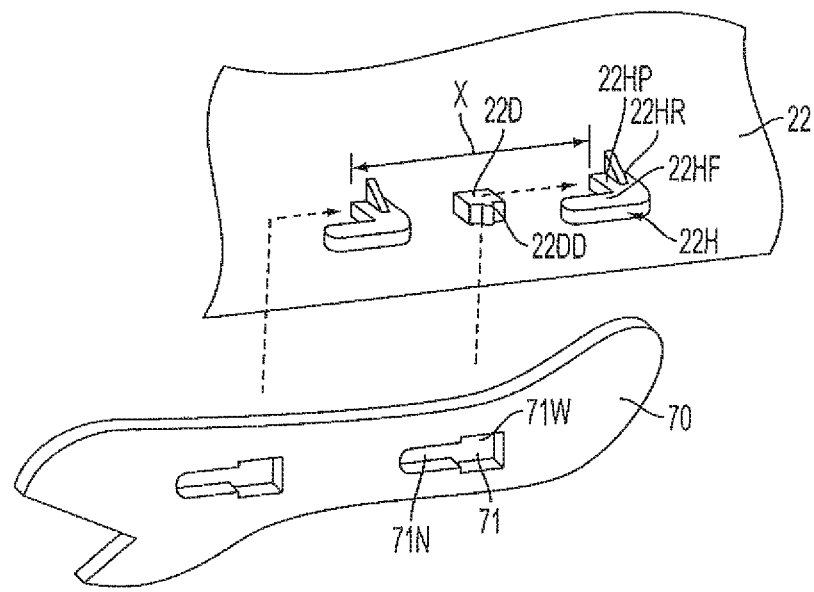
FIG. 10 illustrates an assembly for storing a pushstick.
Figure 11:
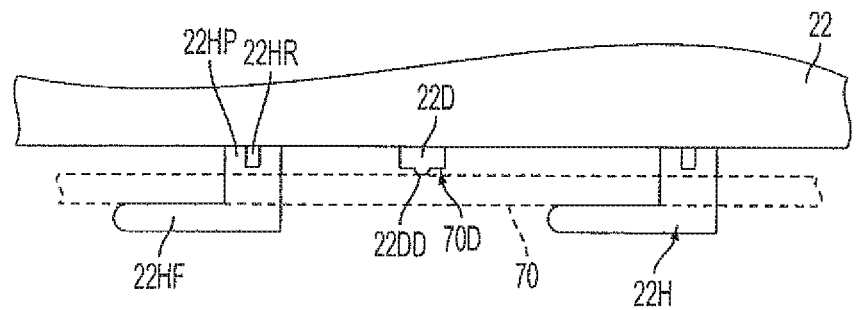
FIG. 11 is a top plan view of the pushstick storing assembly of FIG. 10.

Referring to FIGS. 10-11, a pushstick 70 may be attached to a panel 22 for storage. Panel 22 preferably has at least two holders 22H extending from the panel 22. Each holder 22H preferably has a flange 22HF and a post 22HH connecting the flange 22HF to the panel 22. Preferably, the posts 22HH are disposed at a distance X.

The pushstick 70 preferably has at least two slots 71. Slots 71 are disposed on pushstick 70 at about the same distance as distance X. Slots 71 are at least as long as the flanges 22HF. Slots 71 preferably have a wide area 71W and an adjacent narrow area 71N. The user can thus insert the holders 22H through slots 71, then move the pushstick 70 so that posts 22HH move through the wide area 71W into the narrow area 71N. Preferably, narrow area 71N is shaped so that friction is created between narrow area 71N and post 22HH, thus limiting the movement of pushstick 70 along panel 22. The flanges 22HF preferably limit the movement of pushstick 70 away from panel 22.

Ribs 22HR may be disposed between posts 22HH and panel 22 in order to strengthen posts 22HH.

A post 22D may be disposed between holders 22H. Post 22D preferably does not extend from panel 22 as much as holders 22H. Post 22D may have a protrusion 22DD. Pushstick 70 may also have a decent or protrusion 70D extending therefrom. Preferably protrusion 70D moves past protrusion 22DD as pushstick 70 is moved along posts 22HP. Protrusions 70D and 22DD may contact, preventing pushstick 70 from moving along panel 22.

Persons skilled in the art will recognize that protrusions 70D and/or 22DD may engage notches in panel 22 and/or pushstick 70, respectively. Persons skilled in the art will recognize that the interaction of protrusions 70D and/or 22DD can be used instead or in conjunction with the friction-based retaining arrangement, i.e., where friction is created between narrow area 71N and post 22HH, discussed above.

Holders 22H and/or post 22D are preferably integrally molded with panel 22. Accordingly, pushstick 70 may be held unto the panel 22 without requiring any additional parts.

Persons skilled in the art may recognize other additions or alternatives to the means disclosed herein. However, all these additions and/or alterations are considered to be equivalents of the present invention.

We claim:

1. A table saw comprising:
   a base assembly;
   a table assembly supported by the base assembly;
   a saw assembly supported by at least one of the table assembly and the base assembly, the saw assembly including a saw blade extending through the table assembly;
   a front fixed rail attached to the table assembly;
   a front sliding rail slidingly disposed on the front fixed rail; and
   a fence assembly mounted on the front sliding rail;
   wherein the fence assembly is mounted on a fast boss movably attached to the front sliding rail.

2. The table saw of claim 1, further comprising:
   a rear fixed rail attached to the table assembly; and
   a rear sliding rail slidingly disposed on the front fixed rail;
   wherein the fence assembly is mounted on a second boss movably attached to the rear sliding rail.

3. The table saw of claim 2, wherein the front and rear sliding rails have first and second racks disposed respectively thereon.

4. The table saw of claim 3, further comprising:
   a shaft disposed underneath the table assembly;
   first and second pinions disposed on the shaft and meshingly engaging the first and second racks, respectively; and
   a knob disposed on the shaft for rotating the shaft and first and second pinions.

5. The table saw of claim 1, wherein the front fixed rail comprises an extruded rail and a portion overmolded on the extruded rail.

6. The table saw of claim 1, wherein the front sliding rail has a slot extending along substantially the length of the front sliding rail, the first boss extending through the slot.

* * * * *